United States Patent [19]

Yamamoto et al.

[11] 4,456,101
[45] Jun. 26, 1984

[54] VEHICULAR BRAKE OPERATING SYSTEM

[75] Inventors: Sadashi Yamamoto, Wako; Hiroaki Kayama, Sakato; Masaki Watanabe, Urawa, all of Japan

[73] Assignee: Honda Giken Kogyo Kabushiki Kaisha, Tokyo, Japan

[21] Appl. No.: 319,799

[22] Filed: Nov. 9, 1981

[30] Foreign Application Priority Data

Nov. 8, 1980 [JP] Japan ................................ 55-157433
Jun. 15, 1981 [JP] Japan ................................ 56-91745
Jul. 16, 1981 [JP] Japan ................................ 56-111365

[51] Int. Cl.³ ............................................. F16D 65/38
[52] U.S. Cl. ............................. 188/196 BA; 188/2 D; 188/79.5 GC; 192/111 A
[58] Field of Search ........ 188/196 BA, 196 B, 196 V, 188/24.11, 2 D, 79.5 GC; 192/111 A; 74/501.5

[56] References Cited

U.S. PATENT DOCUMENTS 3,759,352  9/1973  Toplis ........................... 188/196 BA

FOREIGN PATENT DOCUMENTS 30494    6/1981  European Pat. Off. ......... 192/111 A
61023    5/1977  Japan ............................. 188/196 BA
625580   8/1949  United Kingdom .
1053930  1/1967  United Kingdom ......... 188/196 BA
1489192 10/1977  United Kingdom .
1508017  4/1978  United Kingdom .

Primary Examiner—Bruce H. Stoner, Jr.
Assistant Examiner—Robert J. Oberleitner
Attorney, Agent, or Firm—Armstrong, Nikaido, Marmelstein & Kubovcik

[57] ABSTRACT

A vehicular brake operating system which comprises a wheel brake, an operating member, a control wire connecting the wheel brake and the operating member and including an outer wire and an inner wire fitted in the former, and an adjusting device disposed midway of the control wire for automatically adjusting a play of the operating member to a proper level in response to the operation of the control wire.

13 Claims, 28 Drawing Figures

VEHICULAR BRAKE OPERATING SYSTEM

BACKGROUND OF THE INVENTION

1. Field pf the Invention

The present invention relates to a brake operating system for a vehicle, especially, for a motorcycle.

2. Description of the Prior Art

In a vehicle such as a motorcycle, generally speaking, a wheel brake such as a drum brake and an operating member such as a brake lever are connected by means of a control wire, which wire is composed of an outer wire and an inner wire, so that the operating force of the operating member is transmitted to the wheel brake. During repeated braking operations, the play or ineffective stroke of the operating member is increased to exceed a predetermined level either by the wear of the brake shoe in said brake or by the expansion of the inner wire itself of the control wire so that the brake operating feeling is undesirably changed.

SUMMARY OF THE INVENTION

It is a major object of the present invention to provide a vehicular brake operating system of the kind described having a simple and compact structure which is equipped with an adjusting device disposed midway of a control wire whereby a play of an operating member, i.e., an ineffective stroke of the control wire may be automatically adjusted to a proper level.

Another object of the present invention is to provide a vehicular brake operating system which can automatically adjust the play or ineffective stroke of the inner wire of the control wire when the latter exceed a predetermined level and regulate the finally adjusted position of the control wire so that a braking force can be transmitted without fail to a brake without imparting any excessing force to an adjusting device.

Still another object of the present invention is to provide a vehicular brake operating system in which the ineffective stroke of the control wire is not overadjusted but always maintained at a proper level even if an excessive brake operating force is exerted upon the control wire at the time of adjusting that ineffective stroke.

A further object of the present invention is to provide a vehicular brake operating system which can simply set the initial ineffective stroke of the control wire at a predetermined level without an fluctuation at all times.

A further object of the present invention is to provide a vehicular brake operating system which can lightly and smoothly perform the braking operation without requiring any great operating force.

The above and other objects, features and advantages of the present invention will become apparent from the following detailed description of several preferred embodiments of the present invention when taken in conjunction with the accompanying drawings.

BRIEF DESCRIPTION OF THE DRAWINGS

FIGS. 1 to 9 show a brake operating system according to a first embodiment of the present invention, wherein

FIGS. 10 to 15 show a second embodiment of the present invention, wherein

FIGS. 16 and 17 show a modification of final position regulating means for the adjust bolt of the second embodiment, wherein

FIGS. 18 and 19 show another modification of the final position regulating means for the adjust bolt, wherein

FIGS. 21 to 25 show a third embodiment of the present invention, wherein

FIGS. 26 to 28 show a brake operating system according to a fourth embodiment of the present invention, wherein

DESCRIPTION OF THE PREFERRED EMBODIMENTS

With reference to the accompanying drawings, a vehicular brake operating system according to the present invention will now be described in connection with a few embodiments thereof applied to a control wire of a brake of a motorcycle. In the following description of the drawings and embodiments, the parts shared among the respective embodiments are indicated at identical reference characters.

Figure 1:
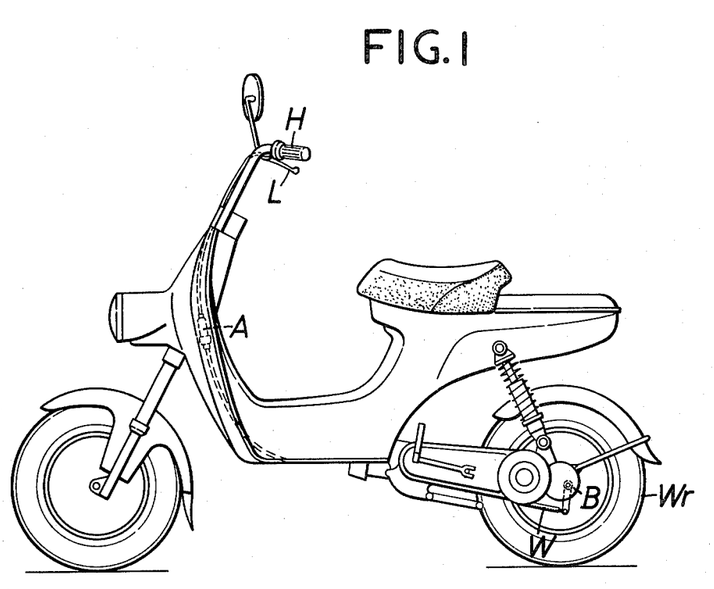
FIG. 1 is a side elevation showing a motorcycle which is equipped with the brake operating system.

Referring first to FIGS. 1 to 9, there is shown a first embodiment of the present invention. In FIG. 1, a brake lever L attached to the handle H of a motorcycle and a brake B attached to the rear wheel Wr of the motorcycle are connected together by means of a control wire W, which wire is constructed, as customary, of an outer wire Wo and an inner wire Wi fitted in the outer wire Wo. The inner wire Wi has its one end connected to the brake lever L and its other end connected to the actuating portion of the brake B thereby to transmit to the latter such an operating force B as is applied to the brake lever L.

Midway of the control wire W, there is disposed an adjusting device A which is made operative to automatically adjust the stretch of the inner wire Wi. Here, "the stretch of the inner wire Wi" consists of the stretch of the inner wire Wi itself and the substantial stretch of the inner wire Wi due to the internal wear of the brake B itself such as the wear of the brake shoe (although not shown) of the brake B.

Figure 2:
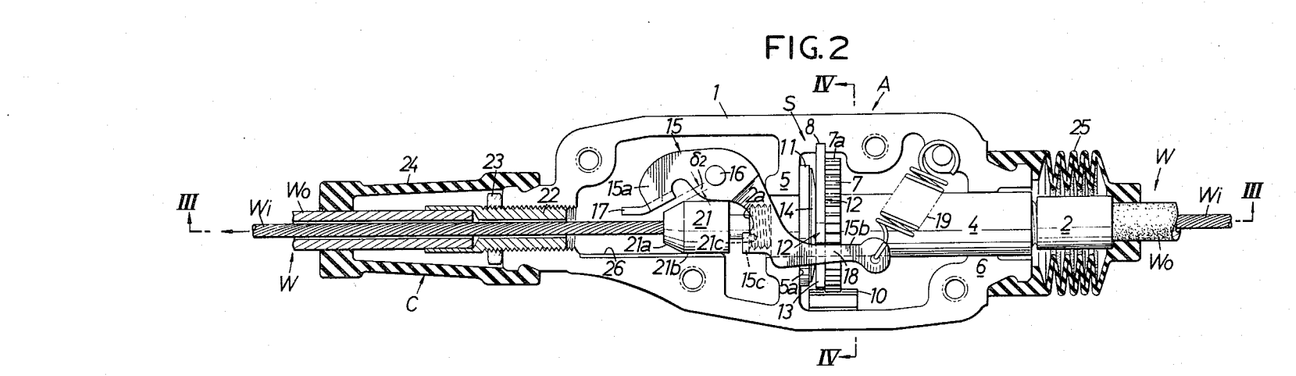
FIG. 2 is a longitudinally sectional side elevation of the adjusting device.

Next, the construction of an adjusting device A will be described. As shown in FIG. 2, there is arranged at a suitable position of the motorcycle a two-split housing 1 which is so disposed midway of the outer wire Wo of the control wire W as to form a part of the outer wire Wo, and the inner wire Wi longitudinally extends through the housing 1.

Into the housing 1, there is axially movably inserted from one end (i.e., the righthand end, as viewed in FIGS. 2 and 3) thereof an adjust bolt 2 in which the inner wire Wi is fitted and which has its outer end integrally jointed to such one end of the outer wire Wo as leads to the brake B.

That portion of the adjust bolt 2, which is disposed in the housing 1, is integrally formed with a screw portion 3 having its outer circumference formed with a male thread 3a. Within the housing 1, the adjust bolt 2 is fitted in a cylindrical adjustor 4 such that its screw portion 3 is screwed in a female thread 4a formed in the inner wall of the adjustor 4, and the adjustor 4 has both its end portions rotatably supported by bearings 5 and 6 which are integrally formed with the housing 1.

Figure 4:
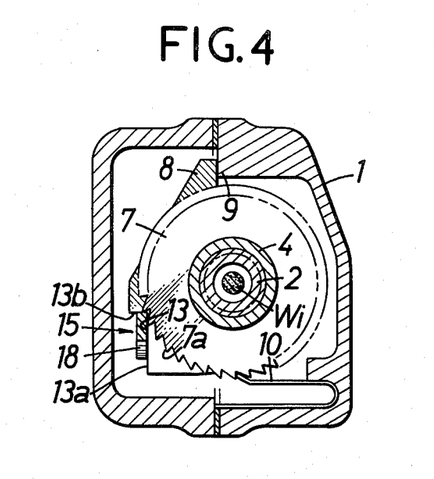
FIG. 4 is a section taken along line IV—IV of FIG. 2.
Figure 5:
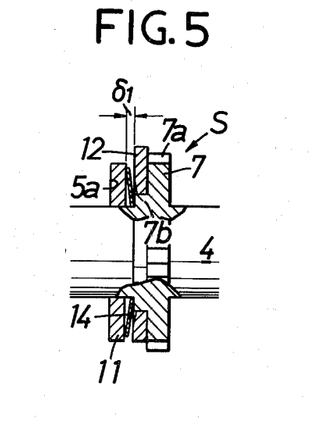
FIG. 5 is a sectional view showing a portion of FIG. 2.
Figure 6:
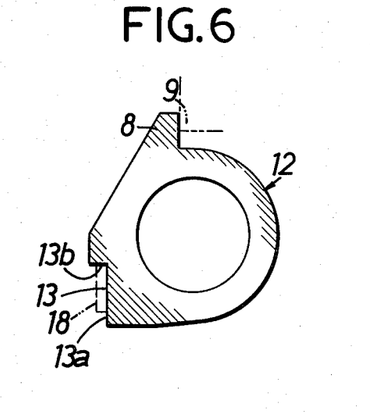
FIG. 6 is a front elevation showing a stopper plate.

As clearly seen from FIGS. 4 and 5, the adjustor 4 has its intermediate portion integrally formed with a ratchet wheel 7 which is made operative to rotate the adjustor 4 in one direction (i.e., in the clockwise direction, as viewed from FIG. 4). On a boss 7b of the ratchet wheel 7, on the other hand, there is rotatably supported an annular stopper plate 12 which constitutes the stopper mechanism S of the adjustor 4 together with one side surface 5a of the bearing 5. That stopper plate 12 has its outer circumference partially formed with a notched recess 13, as shown in FIG. 6. This notched recess 13 is formed with a flat slide surface 13a and a retaining surface 13b which extends at a right angle with respect to that slide surface 13a and which is positioned to coextend with the ratchet teeth 7a of the ratchet wheel 7. A pawl 18 of a later-described adjust lever 15 is forced into slidable contact with the slide surface 13a of the aforementioned notched recess 13 so that the pawl 18 engages, when advanced (upwardly in FIGS. 4 and 6), with both the one of the ratchet teeth 7a of the aforementioned ratchet wheel 7 and the retaining surface 13b. On the other hand, the aforementioned stopper plate 12 is integrally formed, at its side opposing the aforementioned notched recess 13, with a stopper tongue 8, which is brought into abutment contact with an abutment surface 9 formed on the inner wall of the housing 1 thereby to regulate the clockwise rotation of the stopper plate 12, as viewed in FIG. 4. As shown in FIG. 4, on the other hand, there is fixed to the housing 1 a U-shaped member 10, which has its leading end engaging with the ratchet teeth 7a of the ratchet wheel 7 thereby to prevent the ratchet wheel 7 from rotating together with the counterclockwise rotation of the stopper plate 12. As clearly seen from FIG. 5, there is sandwiched between the one side surface or stopper 5a of the bearing 5 of the housing 1 and one side surface of the ratchet wheel 7 through a retainer 11 a Belleville spring 14 which has such an elastic force as to bias the adjustor 4 together with the ratchet wheel 7 rightwardly of FIGS. 2 and 5 thereby to establish a clearance $\delta_1$ between that one side surface of the retainer 11 which is near the stopper plate 12 and the one side surface of the stopper plate 12. In this state, moreover, the ratchet wheel 7, i.e., the adjustor 4 and the stopper plate 12 are enabled to rotate together by the advance (i.e., the upward movement, as viewed in FIG. 4) of the pawl 18 due to the rotation of the laterdescribed adjust lever 15.

On the other hand, the adjust lever 15 having a shape of a bell crank is pivoted to the housing 1 in the vicinity of the adjustor 4 by means of a lever pin 16 and has its one end extending to form a first arm 15a and its other extending to form a second arm 15b. The first arm 15a has its leading end formed with a driven member 17 which is formed with such an inclined surface 17a as faces a tapered surface 21a formed on a later-described drive member 21. On the other hand, the second arm 15b is made longer than the first arm 15a and has its leading end portion formed with the pawl 18 which is made engageable with the ratchet teeth 7a of the aforementioned ratchet wheel 7. Moreover, the adjust lever 15 has its intermediate portion integrally formed with a retaining portion 15c which inwardly extends generally at a right angle (with respect to the sheet surface of FIG. 2) and which has its leading end so extending that it can engage with the inner end surface 2a of the aforementioned adjust bolt 2. A return spring 19 having its one end bound to the housing 1 has its other end retained on the leading end of the second arm 15b. This return spring 19 has its tensile force biasing the adjust lever 15 to turn counterclockwise, as viewed in FIG. 2. Thus, the second arm 15b of the adjust lever 15 engages with the retaining surface 13b of the stopper plate 12, and the stopper tongue 8 of the stopper plate 12 engages with the abutment surface 9 so that the inoperative position of the adjust lever 15 is regulated to a fixed position, as seen from FIG. 2.

Within the housing 1, the drive member 21 is fixed to the inner wire Wi and has its leading end formed with the tapered surface 21a of a converging conical surface and its outer circumference formed with a cylindrical slide surface 21b merging into the tapered surface 21a, which slide surface 21b is flattened in the drawing direction of the inner wire Wi. A clearance $\delta_2$ (which is seen in FIG. 2) is established between the aforementioned tapered surface 21a and the inclined surface 17a of the driven member 17 of the first arm 15a of the aforementioned adjust lever 15. Although will be described hereinafter, when the inner wire Wi is drawn to move leftwardly of FIG. 2 during the braking operation, the tapered surface 21a of the drive member 21 can be brought into abutment against the first arm 15a thereby to turn the adjust lever 15 clockwise of FIG. 2 against the tensile force of the return spring 19. On the other hand, the inner end surface 21c of the drive member 21 so faces that it can engage with the inner end surface 2a of the adjust bolt 2.

Figure 7:
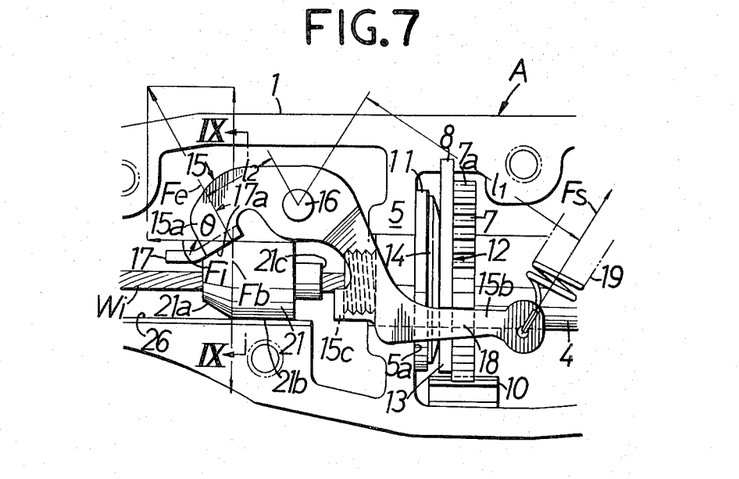
FIGS. 7 and 8 are side elevations each showing the operating relationship between a drive member and an adjust lever.
Figure 8:
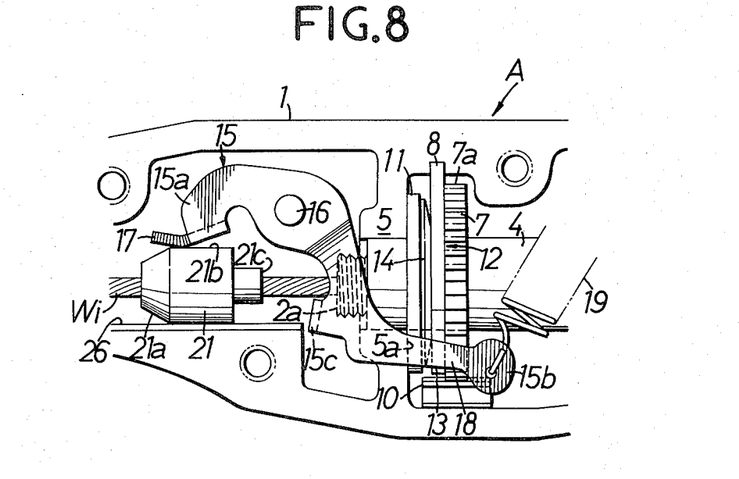
Figure 9:
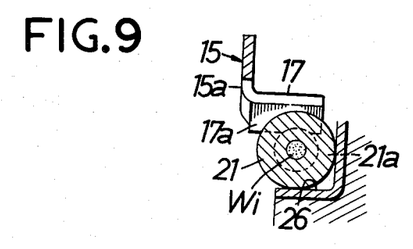
FIG. 9 is a section taken along line IX—IX of FIG. 7.
Figure 10:
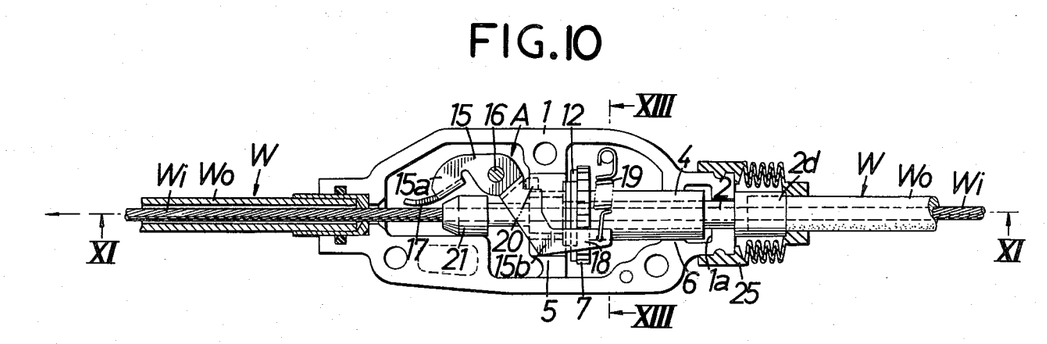
FIG. 10 is a longitudinally sectional side elevation showing the same.
Figure 11:
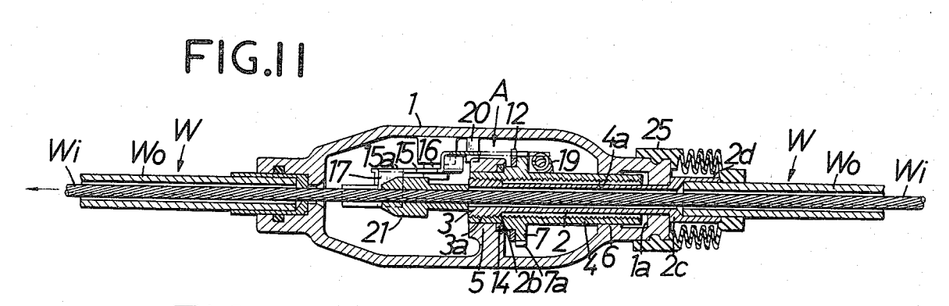
FIG. 11 is a section taken along line XI—XI of FIG. 10.

As clearly seen from FIGS. 7 to 9, that inner wall of the housing 1, which is located at the opposite side to the adjust lever 15 through the drive member 21, is formed with a guide surface 26 which is made operative to slidably guide the slide surface 21b of the aforementioned drive member 21 along the drawing direction of the inner wire Wi. The guide surface 26 is coated with a material having a low friction such as a synthetic resin and is adapted to oppose the transverse thrust to be applied from the adjust lever 15 to the drive member 21.

At the connecting portion between that outer wire Wo of the control wire W, which leads to the brake lever L shown in FIG. 1, and the one end (i.e., the lefthand end, as viewed in FIGS. 2 and 3) of the housing 1, there is disposed clearance adjusting means C which is adapted to adjust the clearance between the tapered surface 21a of the drive member 21 and the inclined surface 17a of the driven member 17 during the inoperation of the brake. That clearance adjusting means C is constructed of a bolt 22, which is rotatably fitted on the end portion of the outer wire Wo and screwed in the end portion of the housing 1, and a nut which is screwed on that bolt 22. Thus, if this bolt 22 is rotated, it is moved axially of the housing 1 thereby to protrude or extract the outer wire Wo connected thereto with respect to the housing 1 so that the position of the drive member 21 fixed to the inner wire Wi can be adjusted.

Here, the adjustment of maintaining the position of the drive member 21 relative to the adjust lever 15, i.e., the aforementioned clearance $\delta_2$ predetermined is performed in the following manner.

When the inner end surface 2a of the aforementioned adjust bolt 2 is brought into abutment contact with the retaining portion 15c of the adjust lever 15 which is usually fixed at its inoperative position, as has been described hereinbefore with reference to FIG. 2, the inner end surface 21c of the drive member 21 is brought into abutment contact with that inner end surface 2a by the action of the aforementioned clearance adjusting means C. Thus, the relative position of the drive member to the adjust lever 15 can be determined so that the normal (or initial) play or ineffective stroke of the control wire can be always maintained at a predetermined level, as will be described hereinafter.

Figure 3:
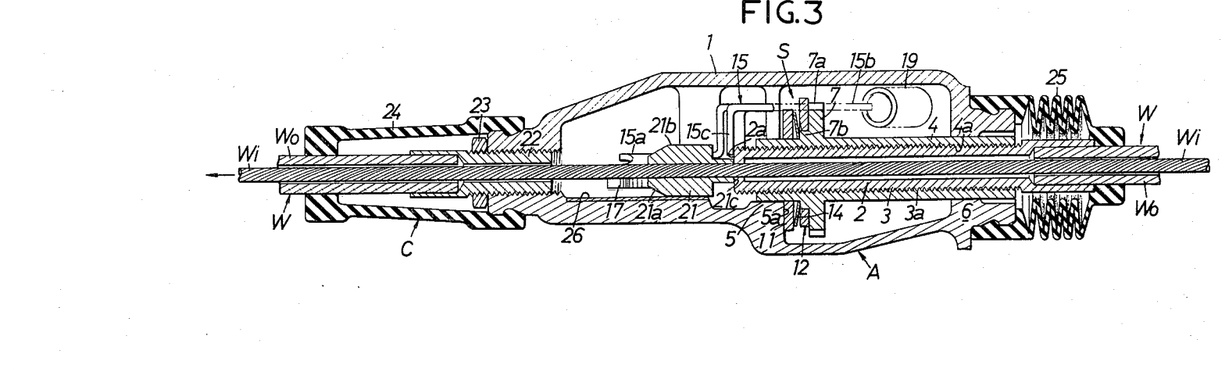
FIG. 3 is a section taken along line III—III of FIG. 2.

As shown in FIGS. 2 and 3, the spaces between the left and right ends of the housing 1 and the outer wire Wo are covered with extensible boots 24 and 25, respectively.

Next, the operation of the embodiment of the present invention will be described in the following. If the brake lever L is squeezed to draw the inner wire Wi of the control wire W in the direction of arrows of FIGS. 2 and 3 with a view to operating the brake B, this brake B can be actuated, as usual, to apply the braking force to the rear wheel Wr.

Now, if the inner wire Wi is drawn to the left, as viewed in FIGS. 2 and 3, at a state in which the play stroke of the control wire W is proper, the tapered surface 21a of the drive member 21 is brought to abut the inclined surface 17a of the driven member of the first arm 15a of the adjust lever 15 to turn the adjust lever 15 clockwise by their wedge action. At this time, the pawl 18 of the second arm 15b retards or moves back (i.e., downwardly in FIG. 4) on the slide surface 13a, but this retard is smaller than one pitch of the ratchet teeth 7a of the ratchet wheel 7 of the adjustor 4. As a result, the leftward drawing force of the inner wire Wi is released by the release of the brake operating force so that the adjustor 4 is left irrotational, even if the adjust lever 15 is turned counter-clockwise by the tension of the return spring 19 thereby to advance or move forward (i.e., upwardly in FIG. 4) the pawl 18, thus performing no adjustment of the stretch of the inner wire Wi.

If the braking operations are repeated, the play or ineffective stroke in each braking operation is gradually increased as a result of the stretch (which consists of the stretch of the inner wire Wi itself and the wear of the brake shoe) of the inner wire Wi. Now, if that stretch so grows as to trouble the braking operation, the retard of the pawl 18 when the adjust lever 15 is turned clockwise by the draw of the inner wire Wi through the drive member 21 fixed thereto exceeds one pitch of the ratchet teeth 7a of the ratchet wheel 7. As a result, the pawl 18 engages with the subsequent one of the ratchet teeth 7a while slightly turning the rotatable stopper plate 12 counterclockwise, as viewed in FIG. 4. Now, if the inner wire Wi is returned to its initial position in response to the release of the braking operation by the spring force of the return spring (although not shown) in the brake B, the adjust lever 15 is turned counterclockwise by the tensile force of the return spring 19. Since, at this time, the pawl 18 of the second arm 15b has engaged with the subsequent one of the ratchet teeth 7a, it rotates the ratchet wheel 7 one pitch in the clockwise direction, as viewed in FIG. 4, so that the adjustor 4 is rotated to the same extent in the same direction. At this time, as the stopper plate 12 has its stopper tongue 8 engaging with the abutment surface 9 so that its further clockwise (as viewed in FIG. 4) rotation is blocked, it is prevented from rotating by more than one pitch of the ratchet wheel 7. When the adjustor 4 is rotated, the adjustor bolt 2 which is integrally jointed to the end portion of the outer wire Wo in an irrotatable manner and is screwed in the adjustor 4 is extruded axially rightwardly of FIGS. 2 and thereby to increase the length of the outer wire Wo between the housing 1 and the brake B so that the inner wire Wi is accordingly drawn into the outer wire Wo whereby the aforementioned play stroke of the inner wire Wi due to the stretch is adjusted.

Moreover, when the adjust lever 15 is turned by the draw of the inner wire Wi, the aforementioned adjustments are repeated as long as the displacement of the pawl 8 is larger than one pitch of the ratchet teeth 7a, making the play stroke of the inner wire Wi proper.

Here, if the brake operating input is so excessive, although the aforementioned play stroke of the control wire W is proper, to forcibly draw the inner wire Wi, the adjusting device A operates to overadjust the control wire W. In this case, that overadjustment is prevented by the action of an overadjust preventing mechanism S, as will be described in the following.

If the inner wire Wi is drawn to the left by a force exceeding the normal brake operating input, it is highly tensed. As a result, the outer wire Wo is subjected to the longitudinal compression thereof so that the Belleville spring 14, which spring force is so adjusted as not to be compressed by the normal brake operating input, is compressed to eliminate the clearance $\delta_1$ between the one side surface of the retainer 11 and the stopper plate 12 until this stopper plate 12 is forced to contact with that one side surface of the retainer 11 so that its rotation is blocked. On the other hand, the adjust lever 15 is rotated by the draw of the inner wire Wi through the drive member 21 against the spring force of the return spring 19 to make the pawl 18 of its second arm 15b retard or move back (i.e., downwardly in FIGS. 4 and 6) on the slide surface 13a of the notched recess 13 of the stopper plate 12. If, in this case, the inner wire Wi is intensely drawn even after the stopper plate 12 has been locked, the pawl 18 retards on the slide surface 13a while being accompanied by the elastic deformations or the like of the brake B and the control wire W. Nevertheless, even if the retard exceeds the one pitch of the ratchet wheel 7, the pawl 18 is prevented from engaging with the subsequent one of the ratchet teeth 7a as a result of the lock of the stopper plate 12.

If the braking force of the inner wire Wi produced by the excessive brake operating input is released, the adjust lever 15 is turned counterclockwise, as viewed in FIG. 2, to merely move the pawl 18 forwardly (i.e., upwardly in FIG. 4) on the slide surface 13a but not rotate the ratchet wheel 7. As a result, the adjustor 4 is left irrotational so that the adjustment of the stretch of the control wire W is not performed to prevent the overadjustment. Moreover, if the aforementioned braking force is released, the stopper plate 12 is moved rightwardly in FIG. 5 by the elastic force of the Belleville spring 14 thereby to establish the aforementioned clearance $\delta_1$ so that the stopper plate 12 is restored to its state for free rotation.

On the other hand, if the inner wire Wi is drawn by an excessive operating input even in a case where an adjustable stretch is generated in the inner wire Wi, the pawl 18 is once retracted by more than one pitch of the ratchet teeth 7a, and the stopper plate 12 is then locked. As a result, when the pawl 18 is in a retracted position by more than one pitch of the ratchet teeth 7a, the stopper plate 12 is released from its locked state after the of the brake operating input so that the pawl 18 can engage with the ratchet teeth 7a thereby to rotate the adjustor 4 whereby the aforementioned stretch adjustment of the inner wire Wi is performed without any trouble. Even in this case, the overadjustment of the inner wire Wi is naturally prevented.

Here, according to the present invention, the automatic adjustment of the aforementioned play stroke of the control wire W is effected without fail by a relatively weak drawing force.

Turning now to FIG. 7, when the tapered surface 21a of the drive member 21 and the inclined surface 17a of the driven member 17 of the adjust lever 15 are brought into abutment against each other by the leftward drawing force Fi of the inner wire Wi, a turning force Fe is exerted upon the adjust lever 15 by the wedge actions of the two surfaces 21a and 17a. Here, if the force required for the aforementioned adjustment is designated at $F_s$, the following Equations hold in FIG. 7:

$$Fe \cdot l_2 = Fs \cdot l_1; \text{ and } Fe = (Fe \cdot l_1)/l_2$$

because of $l_1 > l_2$, $Fe > Fs$.

However, since the drawing force required is $Fi = Fe \cdot \cos\theta$, the drawing input Fi may be weak.

As seen from FIG. 7, moreover, if the adjust lever 15 is turned, a force Fb for transversely bending the drive member 21 is established as a reaction thereof. Nevertheless, the aforementioned guide surface 26 opposes that force Fb so as not to bend the inner wire Wi. Therefore the guide surface 26 can guide the drive member 21 along the drawing direction of the inner wire Wi. Moreover, since the aforementioned guide surface 26 is coated with a material having a low friction, the frictional force between the drive member 21 and the guide surface 26 can be reduced.

On the other hand, when the inner wire Wi is drawn, as has been described hereinbefore, the tapered surface 21a of the drive member 21 is, if the moving stroke of the drive member 21 does not exceed a predetermined level, placed in abutment against the driven member 17 of the adjust lever 15 as shown in FIG. 7, and the adjust lever 15 is turned against the tensile force of the return spring 19. However, if the moving stroke of the drive member 21 exceeds the predetermined level, the driven member 17 of the adjust lever 15 rides on the slide surface 21b of the drive member 21, as shown in FIG. 8, and the adjust lever 15 is prevented from turning more than a predetermined angle of rotation even if the drive member 15 moves more than the predetermined stroke. As a result, the return spring 19 is prevented from being tensed more than necessarily and from having its spring load augmented, and the frictional force between the driven member 17 and the drive member 21 is reduced to a lower level than that when the driven member 17 abuts against the tapered surface 21a. Consequently, the brake operating force by the brake lever L is not wasted and the braking operating is not heavily dragged.

Turning now to FIGS. 10 to 15, there is shown a second embodiment of the present invention. This embodiment is equipped with finally adjusted position regulating means M for preventing the adjust bolt 2 from coming out of the adjustor 4 when the adjust bolt 2 is moved outwardly (i.e., rightwardly in FIGS. 10 and 11) of the housing 1.

This final protruding position regulating means M will be described in the following.

The adjust bolt 2 has its inner end formed with the screw portion 3 of a large diameter and its outer end formed with a head 2d of a large diameter. The aforementioned screw portion 3 has its outer circumference formed with the male thread 3a and its inner end surface formed with a retained step 2b, which is brought, when the adjust bolt 2 is protruded to the outside for adjustment, into engagement with a stopper surface 1a, which is formed on the inner wall at one end (i.e., at the righthand end of FIGS. 10 and 11) of the housing 1, thereby to regulate the outward movement (i.e., rightwardly in FIGS. 10 and 11) of the adjust bolt 2. Moreover, the aforementioned head 2d of large diameter also has its inner end surface formed with a retained step 2c, which is brought into engagement with the outer surface at one end (i.e., at the righthand end of FIGS. 10 and 11) of the housing 1 thereby to regulate the inward movement (i.e., leftwardly in FIGS. 10 and 11) of the adjust bolt 2.

Within the housing 1, the screw portion 3 of the adjust bolt 2 is screwed in the female thread 4a formed in the inner wall of the cylindrical adjustor 4, which in turn is rotatably supported in the bearings 5 and 6 integrally formed with the housing 1.

Figures 13, 14, 15:
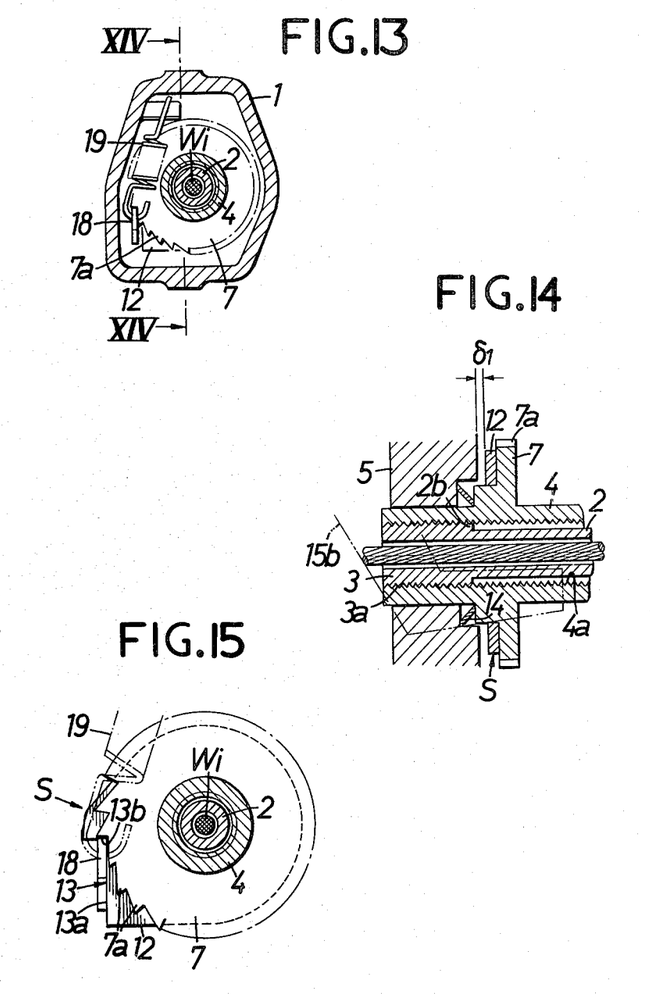
FIG. 13 is a section taken along line XIII—XIII of FIG. 10.
FIG. 14 is an enlarged section taken along line XIV—XIV of FIG. 13.
FIG. 15 is an enlarged view showing a portion of FIG. 13.

As clearly seen from FIGS. 14 and 15, the adjustor has its intermediate portion integrally formed with the ratchet wheel 7 for rotating the adjustor 4 in one direction (i.e., in the clockwise direction, as viewed in FIG. 13). On the boss of the ratchet wheel 7, on the other hand, there is rotatably fitted the annular stopper 2 which constitutes the stopper mechanism S of the adjustor 4 together with the one side surface of the bearing 5. That stopper plate 12 has its outer circumference partially formed with the notched recess 13, but is not formed with the stopper tongue, as shown in FIG. 15, as is different from the aforementioned stopper plate of the first embodiment. Moreover, the return position of the adjust lever 15, which is to engage with the stopper plate 12 and/or the ratchet wheel 7, is in its inoperative state regulated by bringing a stopper 20, which is formed on the housing 1, into engagement with the second arm 15b of the adjust lever 15. In this second embodiment, the aforementioned clearance adjusting means C of the first embodiment is omitted. The constructions and operations of the second embodiment other than those thus far described are substantially similar to those of the first embodiment.

Figure 12:
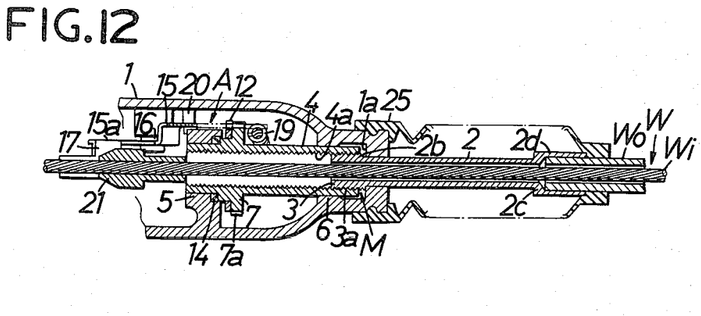
FIG. 12 is a partial view of FIG. 11, showing the finally adjusted position of an adjust bolt.

Now, if the adjustments of the aforementioned play stroke are repeated in accordance with the stretch of the inner wire Wi, the adjust bolt 2 is extruded out of the housing 1 in accordance with that adjustment until the retained step 2b of the screw portion 3 of the adjust bolt 2 abuts against the stopper surface 1a of the housing 1, as seen from FIG. 12, thus finishing those adjustments.

Here, at the adjustment-finished state, most of the larger screw portion 3 at the inner end of the adjust bolt 2 is screwed in the female thread 4a of the adjustor 4, and the screw stock is formed strong enough to stand against the braking force during the braking operation. Moreover, since that adjust bolt 2 is integrally jointed to the one end portion of the irrotatable outer wire Wo and is kept from rotating with the adjustor 4, the adjust bolt 2 can be reset only by rotating the same without disassembling the housing 1.

Figure 16:
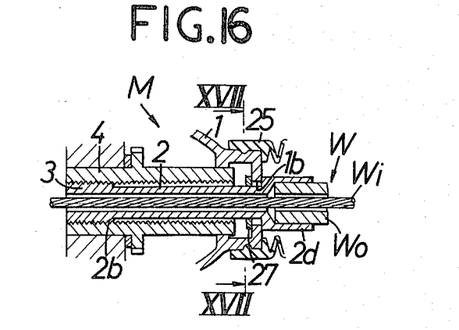
FIG. 16 is a longitudinally sectional side elevation showing the same.
Figure 17:
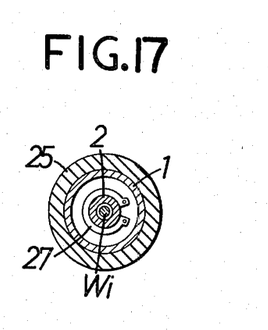
FIG. 17 is a section taken along line XVII—XVII of FIG. 16.

FIGS. 16 and 17 shows a modification of the finally adjusted position regulating means M. In this modification, the adjust bolt 2 is inserted into the housing 1 through a through hole 1b which is formed at one end wall of the housing 1, and then the adjustor 4 is screwed on the larger screw portion 3 of the adjust bolt 2. Within the housing 1, a stopper 27 made of a cir-clip, a resin collar or the like is slidably fitted on the adjust bolt 2 such that it faces the inner surface of the outer wall of the housing 1. When the adjust bolt 2 is protruded to the outside, the retained step 2b of the larger screw portion 3 abuts against the stopper 27 to regulate the finally adjusted position of the adjust bolt 2.

Figure 18:
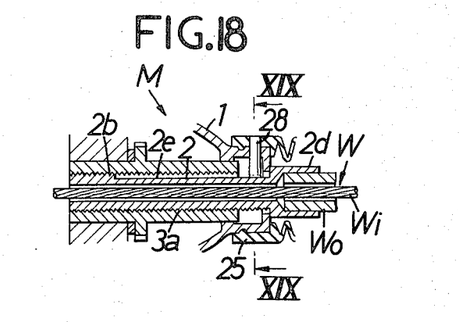
FIG. 18 is a longitudinally sectional side elevation showing the same.
Figure 19:
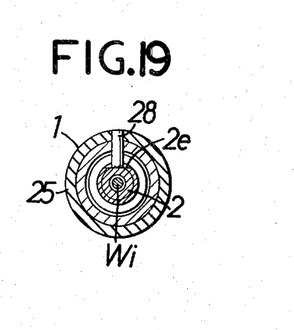
FIG. 19 is a section taken along line XIX—XIX of FIG. 18.

FIGS. 18 and 19 show another modification of the finally adjusted position regulating means M. In this modification, the adjust bolt 2 inserted into the housing 1 is formed with the male thread 3a at its uniform diameter portion except its larger head 2d and with a chamferred flat side 2e for preventing its own rotation on its upper surface other than that of its inner end portion. Moreover, a stopper pin 28 is inserted into the seal boot 25 such that its flattened lower surface abuts against the aforementioned chamferred side 2e. Thus, when the adjust bolt 2 is protruded to its finally adjusted position, the retained step 2b formed at the end portion of the aforementioned chamferred side 2e comes into engagement with the aforementioned stopper pin 28 thereby to regulate the finally adjusted position of the adjust bolt 2. On the other hand, the stopper pin 28 and the chamferred side 2e coact to stop the rotation of the adjust bolt 2.

Figure 20:
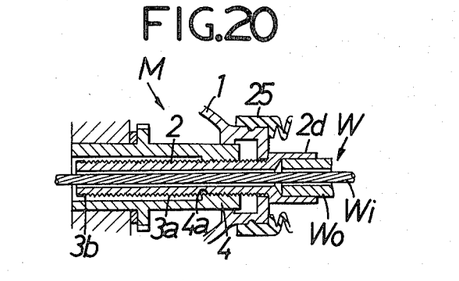
FIG. 20 is a longitudinally sectional side elevation showing still another modification of the final position regulating means of the adjust bolt.
Figure 21:
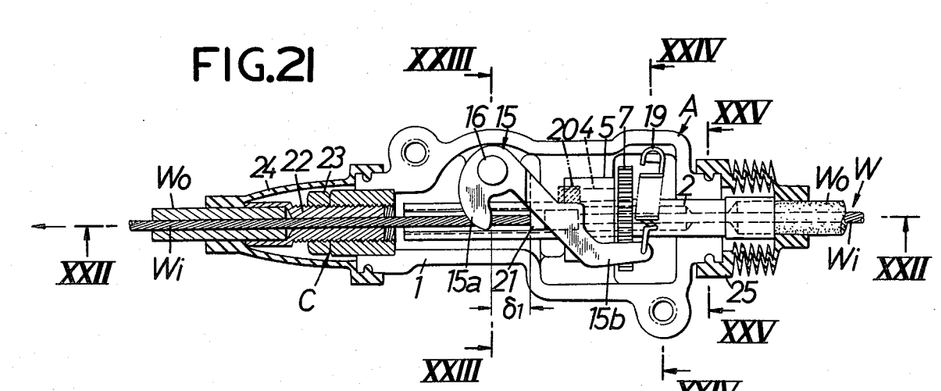
FIG. 21 is a longitudinally sectional side elevation showing the same.
Figure 22:
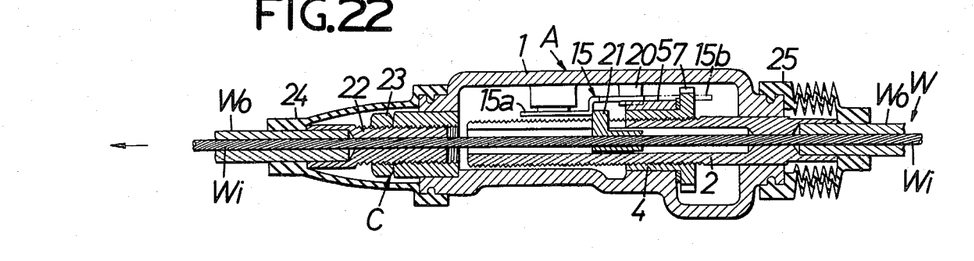
FIG. 22 is a section taken along line XXII—XXII of FIG. 12.
Figure 23:
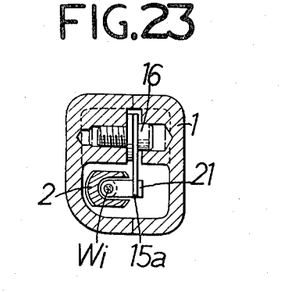
FIG. 23 is a section taken along line XXIII—XXIII of FIG. 21.
Figure 24:
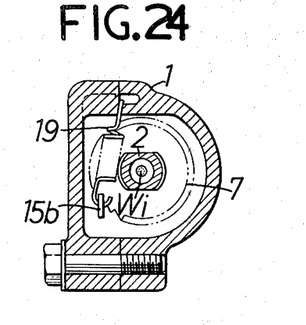
FIG. 24 is a section taken along line XXIV—XXIV of FIG. 21.
Figure 25:
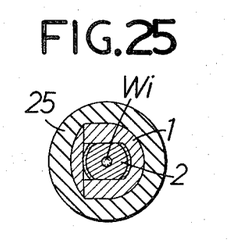
FIG. 25 is a section taken along line XXV—XXV of FIG. 21.

FIG. 20 shows still another modification of the finally adjusted position regulating means M. In this modification, the adjust bolt 2 inserted into the housing 1 is formed with the male thread 3a at its uniform diameter portion except the larger head 2d similarly to the second modification of FIGS. 18 and 19, but a blunted screw portion 3b is formed at the inner end of that male thread 3a. On the other hand, the adjustor 4 is formed at its outer end portion with the female thread 4a which is to be screwed on the aforementioned male thread 3a, whereas the remainder thereof has its internal diameter so enlarged as to allow the aforementioned adjust bolt 2 to freely pass therethrough. As a result, when the adjust bolt 2 is protruded to its finally adjusted position, the blunted screw portion 3b comes to the end portion of the aforementioned female thread portion 4a thereby to stop the rotation of the adjust 4, thus regulating the finally adjusted position of the adjust bolt 2.

Turning now to FIGS. 21 to 25, there is shown a third embodiment of the present invention. This embodiment is substantially similar to the foregoing first embodiment except the following points: the adjust bolt 2 has its outer end axially slidably but irrotatably supported in the housing 1; the adjust lever 15 has its first arm 15a formed into a hook shape and the drive member 21 fixed to the inner wire Wi in a manner to face the first arm 15a is axially slidably engaged with the adjust bolt 2; and the overadjust preventing mechanism for the control wire W is eliminated to simplify the construction.

Figure 26:
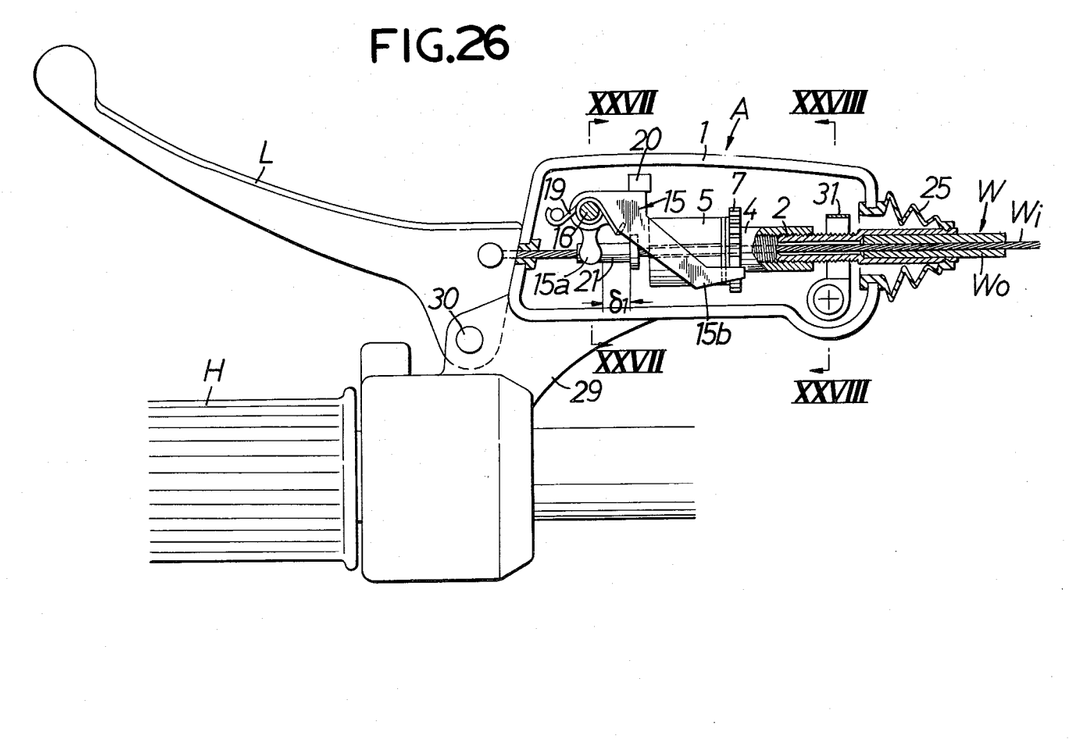
FIG. 26 is a longitudinally sectional side elevation showing an essential portion of a motorcycle which is equipped with that brake operating system.
Figure 27:
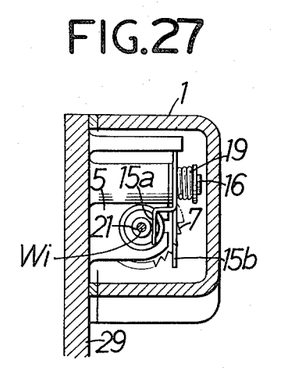
FIG. 27 is a section taken along line XXVII—XXVII of FIG. 26.
Figure 28:
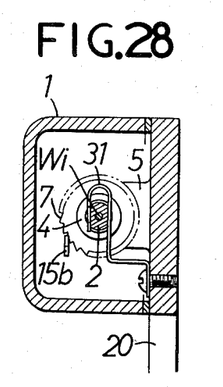
FIG. 28 is a section taken along line XXVIII—XXVIII of FIG. 26.

Turning further to FIGS. 26 to 28, there is shown a fourth embodiment of the present invention. In this embodiment, the stationary housing 1 is made integral with a bracket 29 which in turn is integral with the handle H of the motorcycle, and that inner wire Wi of the control wire W, which is to be inserted into the stationary housing 1, has its one end fixed to that base end of the brake operating lever L, which is pivoted at 30 to the mounting bracket 29. Moreover, the inner wire Wi is usually drawn rightwardly of FIG. 26 by the spring force of the return spring in a drum brake thereby to maintain the brake operating lever L at the state shown in FIG. 26.

The outer wire Wo fitted in the inner wire Wi has its one end connected to the adjust bolt 2 which is accommodated in the housing 1 through the open end thereof. The adjust bolt 2 has both its side surfaces chamferred, and a rotation stopper 31 fixed to the stationary housing 1 is placed to engage with the two chamferred surfaces so that the adjust bolt 2 is restrained from its rotation. On this adjust bolt 2, there is screwed the adjustor 4 which is made integral with the ratchet wheel 7 and which is rotatably supported in the stationary housing 1 through the bearing 5. The adjust lever 15 pivoted to the stationary housing 1 by means of the lever pin 16 has its first arm 15a facing one side of the inner wire Wi and its second arm 15b engaging with the ratchet wheel 7. The adjust lever 15 is so biased as to rotate counter-clockwise in FIG. 26 by the action of the return spring 19 until it abuts against the stopper 20. To the inner wire Wi, there is fixed the drive member 21 which defines an adjustment clearance $\delta_1$ in cooperation with the first arm 15a of the aforementioned adjust lever 15. In the braking operation, the inner wire Wi is drawn by the squeezing operation of the brake operating lever L to rotate the adjust lever 15 in a clockwise direction in FIG. 26 by the abutment engagement between the drive member 21 and the first arm 15a in case the inner wire Wi has a larger play stroke than the adjustment clearance $\delta_1$. When the brake is released, the adjust lever 15 is turned counter-clockwise by the spring force of the return spring 19, whereupon the adjust lever 15 turns the adjustor 4 thereby to adjust the play stroke of the inner wire to a proper level similarly to the foregoing first embodiment. The space between the open end portion of the stationary housing 1 and the outer end of the adjust bolt 2 is covered with the seal boot 25. In this embodiment, the adjusting device A is disposed in the vicinity of the brake operating lever L, thus assuring its protection against the attack of mud or splash.

It is incidentally to be noted that in all the embodiments thus far described, the stationary housing 1 is only required to be formed immovable in the longitudinal direction of the control wire W and not to be necessarily fixed in position rigidly.

In short, the following advantages can be attained in accordance with the present invention.

The adjusting device A to be actuated in cooperation with the operating member L is disposed midway of the control wire W connecting the wheel brake B and the operating member L so that, when the play of the operating member, i.e., the ineffective stroke of the control wire exceeds a predetermined level due to the stretch of the inner wire Wi of the control wire W and the internal wear of the wheel brake B such as the wear of the brake shoe, the excessive stroke can be automatically adjusted to a proper level by the action of the aforementioned adjusting device. As a result, the play of the operating member can be maintained constant at all times thereby to keep the brake operating feeling unchanged.

Moreover, since the aforementioned adjusting device A is disposed midway of the control wire W, the degree of its mounting freedom can be increased and it can be simply attached to any existing wheel brake system without changing the construction of the wheel brake B.

Still moreover, in case the brake operating force, i.e., the drawing force of the inner wire Wi exceeds a predetermined level, the rotation of the adjustor 4 is blocked by the operation of the aforementioned overadjust preventing mechanism S so that no protrusion control of the adjust bolt 2 connected to the outer wire Wo is effected. As a result, the control wire W can be prevented from being overadjusted.

Furthermore, the stopper plate 12 constituting the aforementioned overadjust preventing mechanism S is equipped with the notched recess 13, which is engageable with the pawl 18 of the adjust lever 15 for unidirectionally rotating the adjustor 4, and the tongue 8 which is engageable with the abutment surface 9 formed on the housing 1. As a result, the adjust lever 15 biased to unidirectionally rotate by the return spring 19 can be retained at a fixed position by the aforementioned stopper plate 12 engaging with the abutment surface 9. Therefore, the stopper plate 12 can act as a stopper member for the adjust lever 15, too, and is itself forcibly fixed at a set position, even if it has a machining error or the like, by the biasing force of the return spring 19 as well as the action of the tongue 8, whereby the pawl 18 of the adjust lever 15 can be accurately engaged with the ratchet teeth 7a of the ratchet wheel 7 to effect the proper control of the rotation of the adjustor 4 at all times.

Furthermore, the tapered surface 21a, which is formed on the drive member 12 fixed to the inner wire Wi, and the inclined surface 17a, which is formed on the second arm 15b of the adjust lever 15, abut against each other to perform the so-called "wedge action" thereby rotating the adjust lever 15 with a weak operating force to lightly and reliably make the aforementioned automatic adjustment of the stretch of the control wire W.

Furthermore, the housing 1 has its inner wall formed with the guide surface 26 which guides the drive member 21 slidingly in the drawing direction of the inner wire Wi while opposing the transverse bending force exerted thereupon and which is coated with a material having a low friction. Accordingly, the inner wire Wi is not bent even by any bending force applied thereto so that it can always move in its drawing direction, and the frictional force between the guide surface 26 and the sliding surface of the drive member 21 is reduced by the coating material having the low friction to move the inner wire Wi smoothly without producing resistance relative to the outer wire Wo, ensuring the light braking operation.

Furthermore, the aforementioned drive member 21 is formed with the tapered surface 21a adapted to abut against the free end portion or the second arm 15b of the adjust lever 15, and the cylindrical slide surface 21b adapted to ride on that free end portion. The spring load of the return spring 19 of the adjust lever 15 is therefore prevented in the drawing operation of the inner wire Wi from being increased more than necessarily, and the frictional force between engaging portions of the adjust lever 15 and the drive member 21 is reduced so that the brake operating force is not wasted in the automatic adjustment of the play or ineffective stroke of the control wire W.

Furthermore, the aforementioned finally adjusted position of the adjust bolt 2 can be regulated by the regulating means M and transmitted to the operator without any difficulty. In that finally adjusted position, moreover, a sufficient amount of threading engagement for confronting the brake operating force is retained between the adjust bolt 2 and the adjustor 4 to be screwed on the former so that the adjusting device A is enabled to have such a sufficient strength as to transmit the brake operating force to the wheel brake B without fail.

Furthermore, since the adjust lever 15 is retained on the stopper 20 and held at the predetermined position by the biasing force of the return spring 19 connected thereto and since the initial clearance between the drive member 21 and the adjust lever 15 can be adjusted to a predetermined level by the clearance adjusting means C, the normal (or initial) play or ineffective stroke of the operating member can always be set constant without any variation so that the brake feeling of the control wire after the operating member being assembled and adjusted can always be held proper, and the aforementioned setting itself of the normal play of ineffective stroke can be performed without difficulty.

What is claimed is:

1. A vehicular brake operating system comprising: a wheel brake; an operating member; a control wire connecting said wheel brake and said operating member, said control wire including an outer wire and an inner wire inserted into said outer wire; and an adjusting device disposed midway of said control wire for automatically adjusting a play of said operating member to a proper level in response to the operation of said operating member; said adjusting device including: a stationary housing connected to said outer wire; an adjust bolt supported axially movably but irrotatably in said stationary housing; an adjustor threaded on said adjust bolt and carrying a ratchet wheel for axially moving said adjust bolt when said adjustor is rotated; an adjust lever pivoted to said stationary housing and engaging with the ratchet wheel of said adjustor for rotating said ratchet wheel in one direction; a return spring connected to said adjust lever for biasing the same to turn in one direction; and a drive member secured to said inner wire within said stationary housing and facing said adjust lever with a predetermined spacing therebetween, whereby, when said inner wire moves more than a predetermined stroke, said drive member abuts against said adjust lever to turn the same against the biasing force of said return spring so that said adjustor is rotated together with said ratchet wheel thereby to force said adjust bolt to axially protrude out of said stationary housing.

2. A vehicular brake operating system as set forth in claim 1, wherein said stationary housing is formed integrally with a mounting bracket for said adjust lever.

3. A vehicular brake operating system as set forth in claim 1, further comprising means for regulating the final protruding position of said adjust bolt so as to provide a certain amount of threading engagement between said adjust bolt and said adjustor enough to oppose the brake operating force of said operating member at the finally extruded outermost position of said adjust bolt.

4. A vehicular brake operating system as set forth in claim 1, further comprising an overadjust preventing mechanism mounted on said adjustor for stopping the rotation of said adjustor when the drawing force of said inner wire exceeds a predetermined level.

5. A vehicular brake operating system as set forth in claim 4, wherein said overadjust preventing mechanism includes: a stopper plate rotatably mounted on said adjustor and engaging with said adjust lever; a stopper formed on said stationary housing and facing said ratchet wheel with said stopper plate interposed therebetween; and spring means for urging said stopper plate with a predetermined force in a direction to move away from said stopper, whereby, when the drawing force of said inner wire exceeds the urging force of said pressure spring, said adjustor is moved relative to said stationary housing, while compressing said spring means by the reaction force applied to said outer wire thereby to force said stopper plate into abutment with said stopper to block the rotation of the same.

6. A vehicular brake operating system as set forth in claim 5, wherein said spring means is a Belleville spring.

7. A vehicular brake operating system as set forth in claim 5, wherein said adjust lever has a ratchet pawl engageable with said ratchet wheel, and wherein said stopper plate has a notched recess engageable with said ratchet pawl.

8. A vehicular brake operating system as set forth in claim 7, wherein said stopper plate has a tongue adapted to be engaged with an abutment surface which is formed on said stationary housing.

9. A vehicular brake operating system as set forth in claim 1, wherein said adjust lever has a first arm facing said drive member and a second arm engageable with said ratchet wheel, and wherein said drive member has a tapered surface adapted to abut against said second arm and a cylindrical slide surface merging into said tapered surface, whereby, when said inner wire is drawn to move said predetermined stroke, said first arm rides on the cylindrical slide surface of said drive member to restrain the turning of said adjust lever.

10. A vehicular brake operating system as set forth in claim 9, wherein said first arm has an inclined surface facing the tapered surface of said drive member with a predetermined spacing therebetween, whereby, when said inner wire moves more than said predetermined stroke, the tapered surface of said drive member abuts against the inclined surface of said first arm to perform a wedge action therewith thereby to turn said adjust lever against the biasing force of said return spring.

11. A vehicular brake operating system as set forth in claim 1, 9 or 10, wherein said stationary housing has a guide surface formed thereon for guiding said drive member to slide in the drawn direction of said inner wire against bending forces exerted upon said drive member.

12. A vehicular brake operating system as set forth in claim 11, wherein said guide surface is coated with a material having a low friction.

13. A vehicular brake operating system as set forth in claim 1, 3, 4, 7 or 9 further comprising means for adjusting the initial clearance between said adjust lever and said drive member to a predetermined level.

* * * * *